US006556956B1

United States Patent
Hunt

(10) Patent No.: US 6,556,956 B1
(45) Date of Patent: Apr. 29, 2003

(54) DATA ACQUISITION UNIT FOR REMOTE MONITORING SYSTEM AND METHOD FOR REMOTE MONITORING

(75) Inventor: Stephen Richard Hunt, Milford, OH (US)

(73) Assignee: General Electric Company, Schenectady, NY (US)

( * ) Notice: Subject to any disclaimer, the term of this patent is extended or adjusted under 35 U.S.C. 154(b) by 229 days.

(21) Appl. No.: 09/607,287

(22) Filed: Jun. 30, 2000

(51) Int. Cl.[7] .............................................. G06F 11/00
(52) U.S. Cl. ........................................ 702/188; 702/56
(58) Field of Search .............................. 702/33, 34, 35, 702/36, 54, 56, 66, 67, 75, 76, 77, 79, 113, 114, 115, 122, 124, 125, 126, 141, 177, 182, 183, 188

(56) References Cited

U.S. PATENT DOCUMENTS

| | | | |
|---|---|---|---|
| 5,005,142 A | 4/1991 | Lipchak et al. | 702/183 |
| 5,210,704 A * | 5/1993 | Husseiny | 702/34 |
| 5,877,497 A * | 3/1999 | Binnig et al. | 250/306 |
| 5,951,611 A | 9/1999 | La Pierre | 702/29 |
| 6,026,348 A * | 2/2000 | Hala | 702/56 |
| 6,199,018 B1 * | 3/2001 | Quist et al. | 702/34 |
| 6,298,308 B1 * | 10/2001 | Reid et al. | 702/56 |
| 6,301,572 B1 * | 10/2001 | Harrison | 706/52 |
| 6,308,140 B1 * | 10/2001 | Dowling et al. | 702/60 |

* cited by examiner

Primary Examiner—Marc S. Hoff
Assistant Examiner—Mohamed Charioui
(74) Attorney, Agent, or Firm—David L. Narciso; Pierce Atwood

(57) ABSTRACT

A remote monitoring system has a central computer system and at least one data acquisition unit for collecting data from a machine to be monitored. The data acquisition unit includes an on-site computer system having a central processor and an auxiliary processor. The data acquisition unit further includes one or more sensors for generating a process data signal and one or more sensors for generating a dynamic data signal. The process data signal is fed to the central processor and the auxiliary processor, and the dynamic data signal is fed to the auxiliary processor. A communication link connects the central computer system and the on-site computer system.

7 Claims, 2 Drawing Sheets

DATA ACQUISITION UNIT FOR REMOTE MONITORING SYSTEM AND METHOD FOR REMOTE MONITORING

BACKGROUND OF THE INVENTION

This invention relates generally to remote diagnostic monitoring of rotating machinery such as, but not limited to, gas turbines and more particularly to systems and methods for collecting and analyzing data used for such diagnostic monitoring.

Gas turbines are used for a variety of applications such as driving an electric generator in a power generating plant or propelling a ship or an aircraft. In any application, gas turbines are routinely subject to various maintenance procedures as part of their normal operation. To aid in the provision of such maintenance services, monitoring systems are often employed to provide diagnostic monitoring of the gas turbine. These systems commonly include performance monitoring equipment that collects relevant trend and fault data used for diagnostic trending. In diagnostic trend analysis, certain process data (such as exhaust gas temperature, fuel flow, rotor speed and the like) that are indicative of overall gas turbine performance and/or condition are compared to a parametric baseline for the gas turbine. Any divergence of the raw trend data from the parametric baseline may be indicative of a present or future condition that requires maintenance. Such data can be recorded locally and accessed later by maintenance personnel or, alternatively, can be transmitted to a remote location so that a number of gas turbines can be remotely monitored at a central site.

Gas turbines, like all rotating machinery, are subject to vibrations due to causes such as rotor imbalance, misalignment of components, and worn or defective bearings. Thus, it is useful to monitor vibration and/or other dynamic gas turbine data in addition to the static gas turbine process data discussed above. However, transmitting dynamic signal data from the field units to the central site in a remote monitoring system can be difficult. At present, remote monitoring of process and dynamic data is typically accomplished by using two computers on-site: one for collecting and processing the dynamic data and another for collecting and processing the process data.

One drawback with this approach is the cost of providing and maintaining two separate computers. Another is an inability to analyze the dynamic and process signals in a time coherent manner. When analyzing such data, the ability to review the dynamic and process signals on a simultaneous or time coherent basis provides a better understanding of the overall gas turbine condition. But the current two-computer system does not provide for time coherent review.

Accordingly, it would be desirable to be able to remotely monitor dynamic and process signals at the same time using a single computer system.

BRIEF SUMMARY OF THE INVENTION

The above-mentioned need is met by the present invention which provides a remote monitoring system having a central computer system and at least one data acquisition unit for collecting data from a machine to be monitored. The data acquisition unit includes an on-site computer system having a central processor and an auxiliary processor. The data acquisition unit further includes a means for generating a process data signal and a means for generating a dynamic data signal. The process data signal is fed to the central processor and the auxiliary processor, and the dynamic data signal is fed to the auxiliary processor. A communication link connects the central computer system and the on-site computer system.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
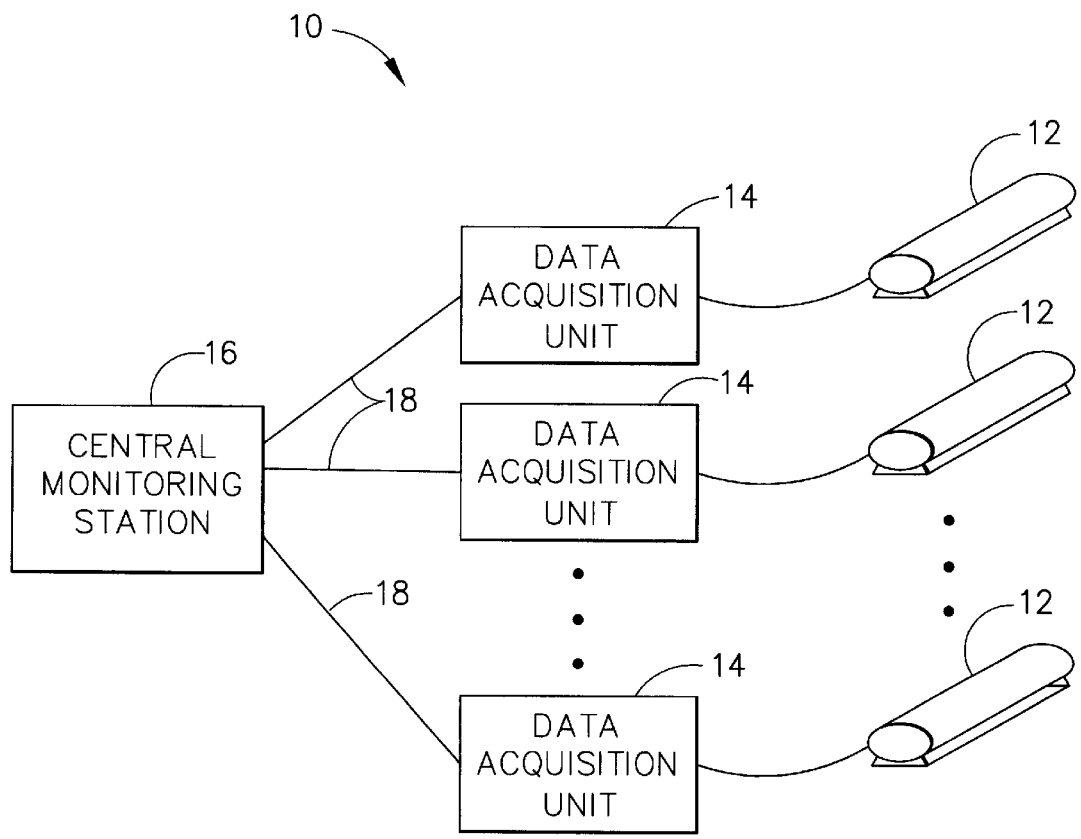
FIG. 1 is a schematic diagram of a distributed remote monitoring system.

Referring to the drawings wherein identical reference numerals denote the same elements throughout the various views, FIG. 1 shows a distributed remote monitoring system 10 that is capable of continuous diagnostic monitoring of rotating machinery 12 located at geographically dispersed locations. In the illustrated example, the rotating machinery 12 comprises a number of gas turbines that may be located in different power generating plants or on different ships or aircraft. However, the rotating machinery 12 is not limited to gas turbines and can be any type of machinery having rotative components such as compressors, pumps, blowers and the like.

A separate data acquisition unit 14 is associated with each rotating machine 12. The data acquisition units 14 collect data from the corresponding machines 12 and transfer the data to a central monitoring station 16 via respective communication links 18. In one embodiment, the data is processed at the data acquisition units 14 and analyzed at the central monitoring station 16. The communication links 18 can be any type of transmission link such as, but not limited to, telephone lines or the Internet.

Figure 2:
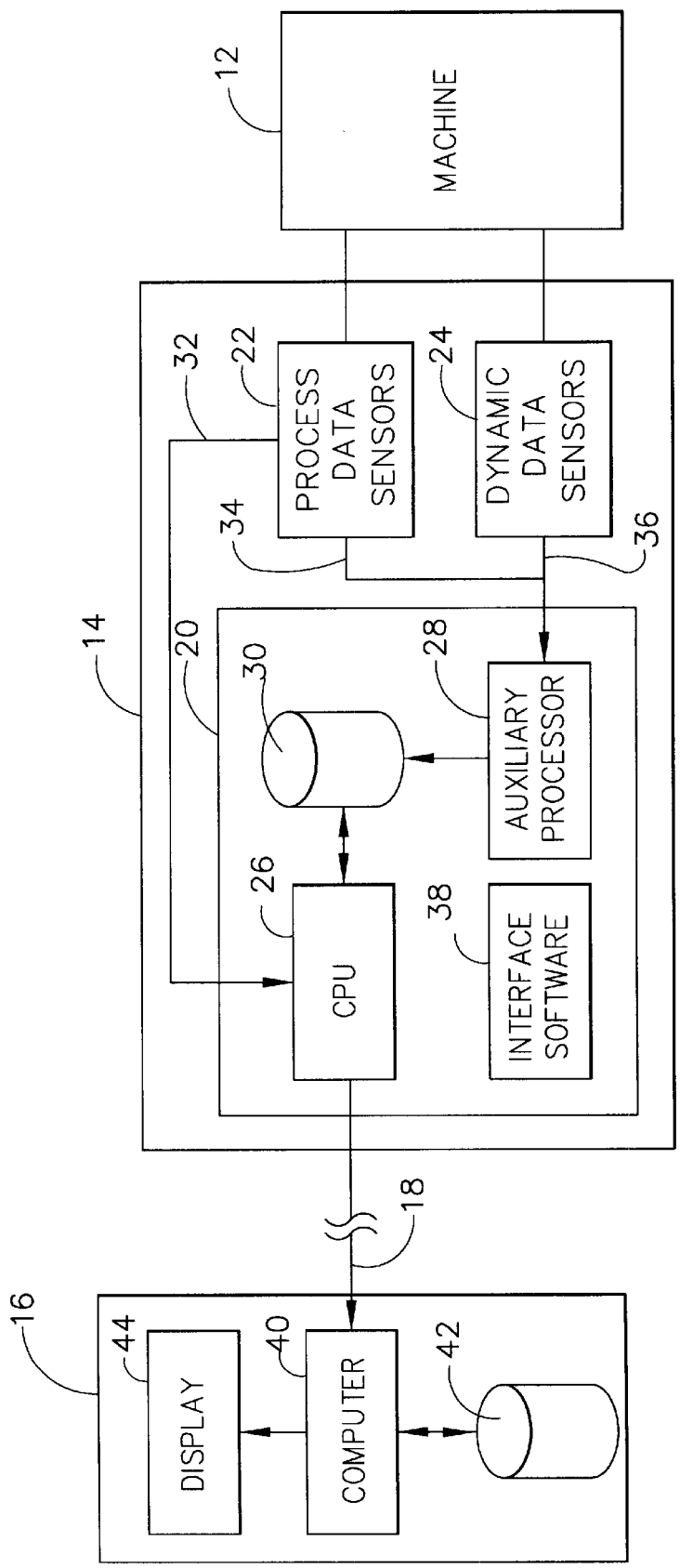
FIG. 2 is a block diagram showing a portion of the remote monitoring system of FIG. 1 in greater detail.

Turning now to FIG. 2, a portion of the remote monitoring system 10 (i.e., the central monitoring station 16 and one of the data acquisition units 14) is shown in greater detail. The data acquisition unit 14 includes an on-site computer system 20, one or more process data sensors 22, and one or more dynamic data sensors 24. The process data sensors 22 communicate with the machine 12 to be monitored to sense process data that are indicative of the overall performance and/or condition of the machine 12. The process data sensors 22 can be any type of performance monitoring equipment, instrumentation or equivalent means capable of sensing the machine process data. In the case of a gas turbine, the process data sensors 22 would ordinarily be incorporated into the gas turbine control system. Examples of typical process data monitored for a gas turbine include, but are not limited to, exhaust gas temperature, fuel flow, rotor speeds, compressor discharge pressure, turbine exhaust pressure, and the like. The dynamic data sensors 24 communicate with the machine 12 to sense dynamic data (such as but not limited to vibration data) which relate to the operation of the machine 12. When monitoring vibration data, the dynamic data sensors 24 would be of the type that convert mechanical motion or energy into electrical signals. For example, the dynamic data sensors 24 may be proximity probes, accelerometers or any means for sensing vibrations.

The on-site computer system 20, which can be any type of computer system such as a PC, includes a primary or central processor such as a central processing unit (CPU) 26, an auxiliary processor 28 and an on-site database 30. The process data sensors 22 generate process data signals that are fed to the CPU 26 via an interface 32, which may be a standard RS/Ethernet interface. The process data signals are also fed to the auxiliary processor 28 via another interface 34, which may be an analog coaxial cable. The dynamic data sensors 24 generate dynamic data signals that are fed to the auxiliary processor 28 via an interface 36, which may also be an analog coaxial cable.

The CPU 26 processes the inputted process data signals to permit diagnosis and prediction of performance related issues for the machine 12 (a process commonly known as trending). Specifically, appropriate trend parameters are calculated from the raw process data signals, and signals representative of the calculated trend parameters are stored in the on-site database 30. The trend parameter signals are also transmitted to the central monitoring station 16 via the communication link 18. The trend parameter signals are viewed at the central monitoring station 16 and compared to a parametric baseline for the machine 12 to detect symptoms indicative of a need for inspection or maintenance. That is, a divergence of the trend parameter signals from the parametric baseline may be indicative of a need to inspect and/or service the machine 12. The parametric baseline is generally empirically derived or generated from a model of the machine 12.

The auxiliary processor 28 processes the inputted process data and dynamic data signals to generate an amplitude spectrum that represents the dynamic data. For example, if the dynamic data sensors 24 sense machine vibration data, then the auxiliary processor 28 would generate a vibration amplitude spectrum for the machine 12. The amplitude spectrum is stored in the on-site database 30 simultaneously with the trend parameter signals. The amplitude spectrum is also transmitted to the central monitoring station 16 via the communication link 18 for viewing and analysis. As will be described in more detail below, the amplitude spectrum can be viewed in real time along side the trend parameter signals. Like in the analysis of the trend parameter signals, the amplitude spectrum is compared to a baseline to diagnose and predict maintenance issues. For instance, the amplitude spectrum could represent a vibration amplitude spectrum that would be compared to a previously obtained, benchmark vibration signature for the machine 12.

In one embodiment, the auxiliary processor 28 is an expansion board that is inserted into an expansion slot of the on-site computer system 20. The expansion board 28 includes a signal analysis algorithm, such as a fast Fourier transform (FFT) algorithm that performs the processing of the inputted process data and dynamic data signals. More specifically, the expansion board 28 takes the dynamic data signals from the dynamic data sensors 24 into an analog-to-digital converter. These signals are then compared against the output of remotely configurable tracking filters to obtain the amplitude spectrum. The tracking filters use the process data signals from the process data sensors 22 and permit predetermined frequencies of the machine 12 to be isolated for analysis. For example, if the machine 12 is a gas turbine, then the filters could be used to track the primary frequency, which is a function of the turbine rotor speed, of the gas turbine 12. Generally, there is a maximum of four filters per channel. The expansion board 28 could be an off-the-shelf product such as the BN4000 Processor board commercially available from Bridgenorth Signal Processing, Inc. of Blaine, Wash.

The on-site computer system 20 includes an interface software application 38 for providing an interface between the CPU 26 and the auxiliary processor 28. The interface software application 38 allows the amplitude spectrum (or a subset thereof) to be transmitted and viewed on a time coherent basis with the trend parameter signals. Thus, the trend parameter signals and the amplitude spectrum can be viewed on the same screen at the same time. Specifically, the trend parameter signals and the amplitude spectrum are both transmitted to the central monitoring station 16 via the communication link 18. As seen in FIG. 2, the central monitoring station 16 includes a central computer system 40 and a central database 42. A display 44 is associated with the central computer system 40 for displaying the trend parameter signals and the amplitude spectrum.

In one embodiment, the interface software application 38 is a modification of the Cimplicity data processing software available from GE Fanuc Automation North America, Inc of Charlottesville, Va. Cimplicity software is an application that takes in data, logs the data into a database, and permits the data to be displayed for visual review. The software application used in the present invention is modified so as to first convert the data processed by the auxiliary processor 28 into a form that is compatible with the Cimplicity-based interface software application. The interface software application 38 then causes the converted form of the amplitude spectrum to be displayed (on the display 44) for visual review in the same manner that standard Cimplicity software displays data.

As mentioned above, the trend parameter signals and the amplitude spectrum are stored in the on-site database 30. The trend parameter signals and the amplitude spectrum, upon transmission to the central monitoring station 16, are also stored in the central database 42. Thus, the display 44 can display real time data or data retrieved from the central database 42. Generally, the trend parameter signals and the amplitude spectrum are logged into the on-site database 30 at a high rate (such as once per second) and are logged into the central database 42 at a lower rate (such as once per minute). The trend parameter signals and the amplitude spectrum are logged into the central database 42 at a lower rate because the data is being transmitted from the on-site computer system 20. A high rate of storage would require an enormous amount of data transmission. The trend parameter signals and the amplitude spectrum can be stored on the on-site database 30 at a higher rate because of its proximity. Storing the trend parameter signals and the amplitude spectrum on the on-site database 30 provides high resolution data that can be accessed as needed. For instance, if there is a machine malfunction or other event in which high resolution data is needed to resolve the problem, then the high resolution data can be accessed from the on-site database 30. The high resolution data is typically maintained on the on-site database 30 for a set period of time, such as 10 days.

The foregoing has described a remote monitoring system that uses a single computer for data acquisition and provides time coherent display of process and dynamic data. Use of one computer system to acquire data reduces the overall cost of the monitoring system. Being able to review trend parameter signals and an amplitude spectrum on a time coherent basis provides a better understanding of the overall machine condition.

While specific embodiments of the present invention have been described, it will be apparent to those skilled in the art that various modifications thereto can be made without departing from the spirit and scope of the invention as defined in the appended claims.

What is claimed is:

1. A system for remotely monitoring at least one machine, said system comprising:

a central computer system including a central database that stores trend parameter signals and an amplitude spectrum;

an on-site computer system having an on-site database that stores said trend parameter signals and said amplitude spectrum, a central processor and an auxiliary processor;

means for sensing process data related to said machine, said means for sensing process data generating a process data signal that is fed to said central processor and said auxiliary processor;

means for sensing dynamic data related to said machine, said means for sensing dynamic data generating a dynamic data signal that is fed to said auxiliary processor, wherein said central processor processes said process data signal to generate said trend parameter signals and said auxiliary processor processes said process data and dynamic data signals to generate said amplitude spectrum; and a communication link between said central computer system and said on-site computer system, wherein said trend parameter signals and said amplitude spectrum are logged into said on-site database at a first rate and are logged into said central database at a second rate, said first rate being greater than said second rate.

2. The system of claim 1 wherein said central processor processes said process data signal to generate trend parameter signals and said auxiliary processor processes said process data and dynamic data signals to generate an amplitude spectrum.

3. The system of claim 2 wherein said amplitude spectrum is a vibration amplitude spectrum.

4. The system of claim 1 wherein said central computer system includes a display for displaying said trend parameter signals and said amplitude spectrum together on a time coherent basis.

5. The system of claim 1 wherein said auxiliary processor is an expansion board inserted into said on-site computer system.

6. The system of claim 5 wherein said expansion board includes a signal analysis algorithm.

7. The system of claim 1 further comprising:

a second on-site computer system having a second central processor and a second auxiliary processor;

second means for sensing process data related to another machine, said second means for sensing process data generating another process data signal that is fed to said second central processor and said second auxiliary processor;

second means for sensing dynamic data related to said another machine, said second means for sensing dynamic data generating another dynamic data signal that is fed to said second auxiliary processor; and a second communication link between said central computer system and said second on-site computer system.

* * * * *